United States Patent [19]
Kemper

[11] 3,761,111
[45] Sept. 25, 1973

[54] DEVICE FOR THE ABSORPTION OF IMPACT ENERGY ESPECIALLY FOR AUTOMOTIVE VEHICLES

[75] Inventor: Gustav-Wilhelm Kemper, Hachenburg, Germany

[73] Assignee: Dynamit Nobel Aktiengesellschaft, Troisdorf, Germany

[22] Filed: Sept. 15, 1970

[21] Appl. No.: 72,312

[30] Foreign Application Priority Data

Sept. 15, 1969  Germany ............... P 19 46 607.0

[52] U.S. Cl. .............. 280/150 AB, 150/1 R, 161/89
[51] Int. Cl. ............................................ B60r 21/10
[58] Field of Search ............................ 280/150 AB; 206/DIG. 30; 244/31, 138; 55/380, DIG. 2; 150/1 R; 161/89

[56] References Cited
UNITED STATES PATENTS

| | | | |
|---|---|---|---|
| 1,182,404 | 5/1916 | Noguchi ........................... | 55/380 X |
| 1,581,450 | 4/1926 | Kampf .............................. | 55/380 X |
| 2,974,912 | 3/1961 | Namsick ........................... | 244/138 |
| 3,364,663 | 1/1968 | Lagerstrom ...................... | 55/380 |
| 3,451,693 | 6/1969 | Carey ............................... | 280/150 AB |
| 3,616,622 | 11/1971 | Friedman ......................... | 55/DIG. 2 |
| 3,618,981 | 11/1971 | Leising ............................ | 280/150 AB |
| 3,476,402 | 11/1969 | Wilfert ............................. | 280/150 |
| 2,859,048 | 11/1958 | Munn ............................... | 280/150 |
| 2,938,689 | 5/1960 | Rollings .......................... | 244/138 |
| 3,410,511 | 11/1968 | Coppa .............................. | 188/1 X |
| 2,418,798 | 4/1947 | Whitmer .......................... | 280/150 X |
| 3,222,016 | 12/1965 | Boone .............................. | 244/145 |
| 3,473,824 | 10/1969 | Carey et al. ..................... | 280/150 |
| 3,481,625 | 12/1969 | Chute .............................. | 280/150 |

*Primary Examiner*—Kenneth H. Betts
*Attorney*—Craig and Antonelli

[57] ABSTRACT

A device for absorbing impact energy, especially for motor vehicles in the case of collisions, having a folding and collapsible bag which is sealed all around and made of a gastight material. A second foldable and collapsible bag which is smaller than the first-mentioned bag is disposed in the first bag so that the smaller bag is first inflated by a high-pressure generator such as a compressed air tank. The second bag can be made of porous material so that the gas pressure is controlled, whereby neither the inner nor the outer bag is subjected to excessive stress.

18 Claims, 2 Drawing Figures

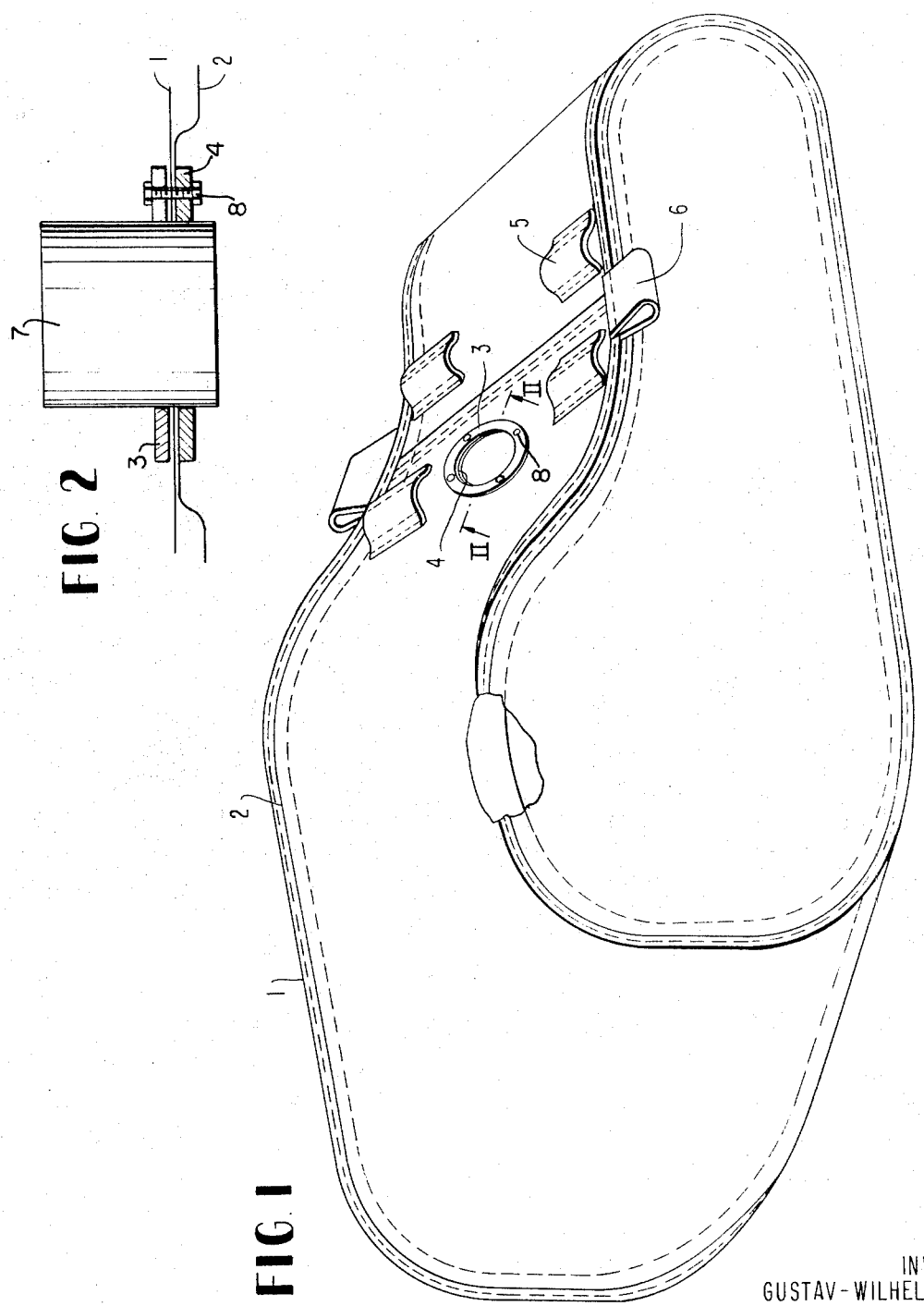

DEVICE FOR THE ABSORPTION OF IMPACT ENERGY ESPECIALLY FOR AUTOMOTIVE VEHICLES

BACKGROUND OF THE INVENTION

The present invention relates to a device for absorbing impact energy, especially for automotive vehicles, and more particularly, to an absorbing device with a foldable and collapsible bag, which is sealed all around and which is made of a gastight material such as, for example, a fabric coated with PVC or a film having an appropriately high tensile strength and with a high-pressure generator of explosive effect such as, for example, a gas cartridge, a compressed-air tank, or the like, which is connected to the bag and responds when a predetermined deceleration value has been exceeded.

Energy absorbers of the aforementioned type have been known in the automobile industry. They serve the purpose of preventing the consequences which normally occur during an accident or, at least, mitigating such consequences as far as possible by providing that when a predetermined deceleration value has been exceeded, the high-pressure generator is triggered and inflates, in the manner of a cushion, a bag arranged between the driver of the vehicle and/or the passenger and the dashboard.

Since this inflation must take place within an extremely short period of time, namely within fractions of a second, if the desired success is to be attained, the energy of the gas flowing into the bag is, perforce, extraordinarily high. However, the danger is thus also correspondingly high that the bag will not withstand the high stress and will be prematurely torn or destroyed.

SUMMARY OF THE INVENTION

It is an aim of the present invention to overcome the problems and disadvantages encountered in the prior art devices.

It is also an object of the present invention to construct the device in such a manner that a bursting of the bag is prevented.

The foregoing problems and disadvantages have been overcome in accordance with the present invention by providing a second foldable and collapsible smaller bag of a textile material, a synthetic material, or the like within the bag, so that this smaller bag is inflated first when the high-pressure generator becomes effective. In this manner, at least part of the energy of the high-pressure generator is first dissipated by the smaller bag so that, even if this smaller bag is destroyed or torn, the gas pressure effective on the larger outer bag will be considerably reduced, namely to such an extent that a tearing or bursting need not be feared any more.

In accordance with a further feature of the present invention, the provision is made to manufacture the additional smaller bag of a porous material such as, for example, nettle, sailcloth, canvas, linen, or the like. In correspondence with the prevailing conditions, that is depending on the size of the device corresponding to the impact energies to be expected or possible, the respective pressure of the high-pressure generator, the materials employed for the bags, the difference between the dimensions of the outer bag and the inner bag, and so forth, the objective can be attained, by an optimum dimensioning of the pore size, that the gas pressure is controlled in such a manner that neither the inner nor the outer bag is subjected to excessive stress.

Advantageously, the two bags are arranged in accordance with the present invention such that the required gas inlet openings are disposed so that they are congruent, and the two bags are connected with each other in a gastight fashion in the zone of these inlet openings by means of two flanged rings, by a threaded connection. Since, when the bags are inflated, this zone of the inlet openings will be especially exposed to a relatively high tensile stress, it is advantageous to connect the two bags flat with each other in the zone of the inlet openings, for example, by cementing, gluing, welding, or the like, whereby a correspondingly larger thickness of the bag material under tensile stress is obtained and, consequently, the danger of tearing apart is diminished.

BRIEF DESCRIPTION OF THE DRAWING

These and further aims, objects and advantages of the present invention will become more apparent from the following description when taken in conjunction with the accompanying drawing which shows, for purposes of illustration only, an embodiment in accordance with the present invention and wherein:

FIG. 1 is a perspective view of the device in accordance with the present invention; and FIG. 2 is a fragmentary sectional schematic view along line II—II of FIG. 1, showing the zone of the inlet opening.

DETAILED DESCRIPTION OF THE DRAWING

Referring now to the drawing and, in particular, to FIG. 1, the bag 1 is made from a coated fabric with the somewhat smaller bag 2 being made of an uncoated fabric and being arranged at an all-around equal spacing of, for example, 30mm. Both bags 1 and 2 are disposed to be congruent with respect to the inlet opening 3 and are connected with each other, as shown in FIG. 2, in a gastight fashion in the zone of this inlet opening by means of the flange rings 4 by a threaded connection 8 and, optionally, by cementing, welding, or the like.

In the zone of the flange rings 4, the high-pressure generator 7 is disposed such that, when it becomes effective, only the inner bag 2 is first inflated, and only after any bursting of the bag, or after the gas has penetrated through the pores provided in the bag 2, the bag 1 is likewise exposed to the gas pressure. Thus, the bag 1 is not exposed to the full gas pressure but, rather, is at most subjected to such a reduced gas pressure that a destruction of the bag 1 is prevented with certainty.

The loops 5 and 6 are attached to the outer bag 1 in order to store the device of this invention in the folded, rolled up, or the like condition.

While I have shown and described an embodiment in accordance with the present invention, it is to be clearly understood that the same is susceptible to numerous changes and modifications as will be apparent to one skilled in the art, and I, therefore, do not wish to be limited to the details shown and described herein but intend to cover all such changes and modifications as encompassed by the scope of the present invention.

I claim:

1. Device for absorption of impact energy especially for automotive vehicles, comprising foldable and collapsible first bag means made of a gas-tight material sealed completely around, foldable and collapsible second bag means made of a gas-porous material, said second bag means being of smaller dimensions than said first bag means and being arranged inside of said first bag means, and high-pressure generator means for producing an explosive inflating effect, said generator means being operatively connected with said first bag means by way of said second bag means whereby said second bag means is inflated prior to inflation of said first bag means upon actuation of said generator means, said second bag means being shaped similarly to said first bag means, the walls of said second bag means being approximately equally closely spaced from corresponding walls of said first bag means over substantially the entire circumference of said second bag means when said device is in the fully inflated condition, said first and second bag means having a congruent inlet opening, a plurality of flange rings being provided for connecting said bag means together in a gas-tight manner in the zone of the inlet opening by connecting means interconnecting said flange rings.

2. Device according to claim 1, wherein said connecting means includes threaded means.

3. Device according to claim 1, wherein portions of said first and second bag means are flattened against one another in the zone of the inlet opening by said flange rings.

4. Device according to claim 1, wherein said first bag means is made of a film having high tensile strength.

5. Device according to claim 1, wherein said first bag means is made of a fabric coated with PVC.

6. Device according to claim 1, wherein said high-pressure generator means is a gas cartridge.

7. Device according to claim 1, wherein said high-pressure generator means is a compressed-air tank.

8. Device according to claim 1, wherein said second bag means is made of textile material.

9. Device according to claim 1, wherein said second bag means is made of synthetic material.

10. Device according to claim 1, wherein said gas-porous material is selected from the group consisting of nettle, canvas, and linen.

11. Device according to claim 10, wherein the distance between the walls of said first and second bag means is approximately 30mm when said device is in the fully inflated position.

12. Device according to claim 1, wherein said first and second bag means are connected with each other in the zone of the inlet opening by cementing or welding along at least a portion thereof.

13. Device according to claim 1, wherein said first bag means is made of a film having high tensile strength.

14. Device according to claim 13, wherein said porous material is made from the group consisting of nettle, canvas and linen.

15. Device according to claim 14, wherein said first and second bag means are connected with each other in the zone of the inlet opening by cementing or welding along at least a portion thereof.

16. Device according to claim 1, wherein said first bag means is in communication with said generator means exclusively by way of said second bag means.

17. Device according to claim 1, wherein the distance between the walls of said first and second bag means is approximately 30mm when said device is in the fully inflated position.

18. Device according to claim 2, wherein the distance between the walls of said first and second bag means is approximately 30mm when said device is in the fully inflated position.

* * * * *